Aug. 30, 1932.     J. BUCHLI     1,873,953
COUPLING
Filed Aug. 24, 1931

Inventor
Jacob Buchli
By Alfred N. Dyson
Attorney.

Patented Aug. 30, 1932

1,873,953

UNITED STATES PATENT OFFICE

JACOB BUCHLI, OF WINTERTHUR, SWITZERLAND

COUPLING

Application filed August 24, 1931, Serial No. 559,032, and in Germany August 18, 1930.

This invention relates to improvements in couplings between rotating shafts of variable eccentricity and a uniform angular velocity, and more particularly to an individual axle drive for power driven vehicles.

When a shaft susceptible of variations in its position, such as the axle of the traction wheels of a power driven vehicle, is to be driven from the fixed position shaft of a source of power it is necessary that some coupling means be provided to allow for the variations in relative position of the two shafts. An example of the condition above given is to be found in the drives of vehicles such as an electric locomotive, in which the axle of each pair of traction wheels is to be driven from an electric motor mounted on a frame which is usually spring supported from the wheel axles. The motor shaft will be relatively fixed in its position, but the position of the wheel axle to be driven will vary within wide limits relative to the motor shaft, due to the lack of uniformity in the level of the wheels. A fixed speed ratio between the motor shaft and the driving wheel axle is however desired. A coupling must therefore be provided between the relatively fixed position motor shaft and the variable position axle of the traction wheels to permit rotation of the shaft and of the axle at the variable eccentricity unavoidably present and at the fixed speed ratios desired.

It is, therefore, among the objects of the present invention, to provide a coupling for use between two shafts of variable eccentricities which are to rotate at a substantially equal angular velocity.

Another object of the invention is to provide a coupling for use between two shafts of variable eccentricity in which the shafts are so connected by levers as to secure rotation of the shafts at a uniform angular velocity regardless of the relative positions of the shafts.

Another object of the invention is to provide a coupling between two rotating elements of variable eccentricity which coupling will permit relative vertical and lateral movement therebetween, independently of the relative angular rotation of such elements.

Figure 1:
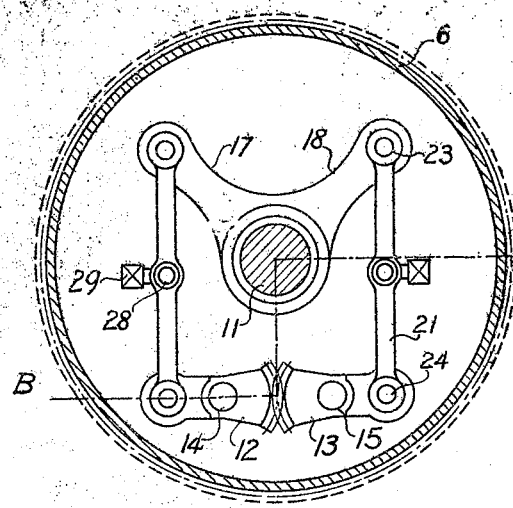
Figure 2:
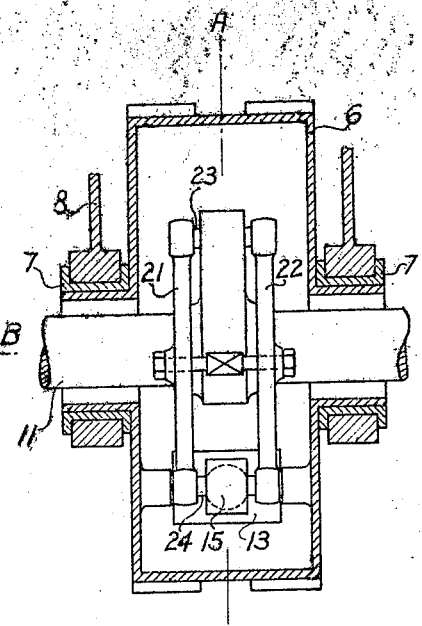
Figure 3:
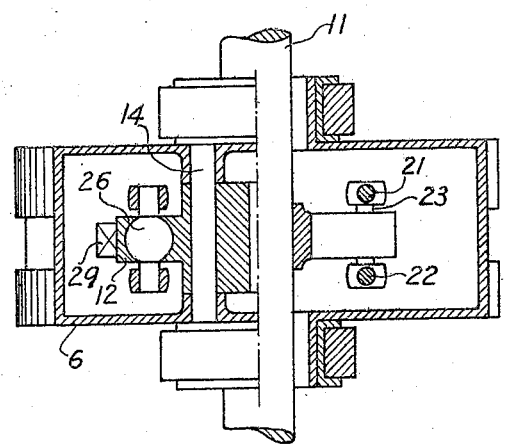

Objects and advantages, other than those above set forth, will be apparent from the following description when read in connection with the accompanying drawing in which:

Fig. 1 illustrates one embodiment of the present invention taken on the line A—A of Fig. 2, Fig. 2 is a side elevation of a coupling according to the present invention with a hollow driving gear, containing the coupling structure, shown in cross section, and Fig. 3 is a section taken on the line B—B of Fig. 1.

Referring more particularly to the drawing by characters of reference, the reference 6 designates a hollow gear supported by bearings 7 from a frame 8 (only a fragment of which is shown) of a power driven vehicle. The gear 6 is adapted to be driven from a source of power (not shown) having a fixed driving shaft position relative to the frame of the vehicle. The shaft to be driven is partially shown at 11 and extends through the gear 6 so as to be relatively movable therein in a vertical or horizontal plane without contact with the hubs of the gear.

The driving gear 6 and the driven shaft 11, herein assumed to be the axle of a pair of traction wheels (not shown), are coupled in such manner that the axes of rotation may assume any position relative to each other. The gear 6 is provided with a plurality of engaging gear segments 12 and 13, pivotally mounted therein at 14 and 15 and the shaft 11 is provided with a crank having two arms 17 and 18 extending at an angle from the shaft on the side thereof opposite the gear segments 12 and 13. Each of the gear segments are connected with one arm of the crank by means of a pair of rods as at 21 and 22 which are joined by pins 23 and 24 having spherical portions as at 26 retained within a spherical cavity in the ends of the gear segments opposite the teeth thereof and in the ends of the crank arms to provide a ball and socket joint action which will permit the connecting rods 21, 22 to assume positions in a plane other than a vertical plane. The connecting rods are joined at substantially their mid point by a bolt as at 28, which serves to stiffen the rods, to which bolt is secured a weight 29.

The present coupling has numerous advantages over couplings now known for a similar purpose, such as the capability of transmitting greater torques than was possible heretofore, simpler structure and particular suitability for drives of small dimension. The masses of the coupling are distributed symmetrically to the vertical plane indicated at A—A of Fig. 2 and the weight 29 tends to retain the connecting rods 21 and 22 in their normal position as shown in the drawing thereby eliminating any tendency toward binding at the several joints of the coupling structure.

Although but one embodiment of the invention has been illustrated and described, it will be apparent to those skilled in the art that various changes and modifications may be made therein without departing from the spirit of the invention or from the scope of the appended claims.

The invention claimed is:

1. In a coupling for rotating elements, a hollow gear, a shaft extending through said gear and spaced therefrom, said shaft being movable in all directions relative to said gear, engaging gear segments carried by said gear interiorly thereof, a crank secured upon said shaft interiorly of said gear, and rods connecting said gear segments and said crank.

2. In a coupling for rotating elements, a hollow gear rotating about a substantially fixed axis, a shaft extending through said gear and spaced therefrom, said shaft being movable in all directions relative to said gear, engaging gear segments pivotally mounted upon and within said gear, a crank fixed upon said shaft within said gear, and rods connecting said gear segments and said crank to permit change of the relative positions thereof.

3. In a coupling for rotating elements, a hollow gear rotating about a substantially fixed axis, a shaft extending through said gear and spaced therefrom, said shaft being movable in all directions relative to said gear, engaging gear segments pivotally mounted upon and within said gear, a crank fixed upon said shaft within said gear, and rods connecting said gear segments and said crank to permit change of the relative positions thereof; said gear segments, said cranks and said rods being formed and arranged symmetrically to a plane substantially at right angles to the axis of rotation of said gear.

4. In a coupling for rotating elements, a hollow gear rotating about a substantially fixed axis, a shaft extending through said gear and spaced therefrom, said shaft being movable in all directions relative to said gear, engaging gear segments pivotally mounted upon and within said gear, a double armed crank fixed upon said shaft within said gear, and a pair of rods connecting one end of each of said gear segments and one of the arms of said crank, the engaging portions of said rods with said gear segments and said crank being formed as a ball joint to permit changes in the relative positions of said gear segments and said crank.

In testimony whereof I have hereunto subscribed my name this 7th day of August A. D. 1931.

JACOB BUCHLI.